United States Patent
Finot et al.

(10) Patent No.: US 8,861,124 B1
(45) Date of Patent: Oct. 14, 2014

(54) INTEGRATED SENSOR FOR MONITORING LASER POWER IN A HEAT ASSISTED MAGNETIC RECORDING DISK DRIVE

(71) Applicant: Western Digital (Fremont), LLC, Fremont, CA (US)

(72) Inventors: Marc A. Finot, Palo Alto, CA (US); Matthew R. Gibbons, San Jose, CA (US); William J. Kozlovsky, Sunnyvale, CA (US); Hongxing Yuan, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/829,438

(22) Filed: Mar. 14, 2013

(51) Int. Cl.
*G11B 5/02* (2006.01)
*G11B 13/08* (2006.01)

(52) U.S. Cl.
CPC ..................... *G11B 13/08* (2013.01)
USPC .... 360/59; 369/13.13; 369/13.26; 369/13.32; 369/13.33; 369/112.27; 369/116

(58) Field of Classification Search
None
See application file for complete search history.

(56) References Cited

U.S. PATENT DOCUMENTS

| | | | |
|---|---|---|---|
| 5,392,273 A | 2/1995 | Masaki et al. | |
| 5,805,559 A | 9/1998 | Murakami et al. | |
| 6,046,970 A | 4/2000 | DeCusatis et al. | |
| 6,359,433 B1 | 3/2002 | Gillis et al. | |
| 6,671,232 B1 | 12/2003 | Stupp | |
| 6,703,677 B2 | 3/2004 | Lee et al. | |
| 6,744,582 B2 | 6/2004 | Shimoda et al. | |
| 6,747,257 B1 | 6/2004 | Farnsworth et al. | |
| 6,771,440 B2 | 8/2004 | Smith | |
| 6,858,871 B2 | 2/2005 | Okada | |
| 6,982,843 B2 | 1/2006 | Coffey et al. | |
| 7,095,577 B1 | 8/2006 | Codilian et al. | |
| 7,161,882 B2 | 1/2007 | Lehr et al. | |
| 7,177,253 B2 | 2/2007 | Ishibashi et al. | |
| 7,310,206 B2 | 12/2007 | Liu et al. | |
| 7,480,214 B2 | 1/2009 | Challener et al. | |
| 7,688,689 B2 | 3/2010 | Gage et al. | |
| 7,710,686 B2 | 5/2010 | Kim et al. | |
| 7,724,470 B2 | 5/2010 | Poon et al. | |
| 7,876,655 B2 | 1/2011 | Sasaki | |
| 7,898,759 B2 | 3/2011 | Matsumoto et al. | |
| 7,940,486 B2 | 5/2011 | Shimazawa et al. | |
| 8,023,226 B2 | 9/2011 | Shimazawa et al. | |
| 2002/0136115 A1 | 9/2002 | Kadlec et al. | |

(Continued)

OTHER PUBLICATIONS

Lawrence A. Johnson, "Accelerated Aging Test of 1310 nm Laser Diodes", ILX Lightwave Application Note #29, May 31, 2006, http://www.ilxlightwave.com/appnotes/AN%2029%20REV01%20Accelerated%20Aging%20Test%20of%201310nm%20LD.pdf.

(Continued)

*Primary Examiner* — Wayne Young
*Assistant Examiner* — Brian Butcher

(57) ABSTRACT

A heat-assisted magnetic recording (HAMR) transducer is coupled with a laser for providing energy and has an air-bearing surface (ABS) configured to reside in proximity to a media during use. The HAMR transducer includes a waveguide optically coupled with the laser and an optical power monitor optically coupled with the waveguide. The waveguide directs energy from the laser toward the media. The optical power monitor is optically coupled with the waveguide. The optical power monitor for captures a portion of the energy, converts the portion of the energy to heat and measures a local temperature proximate to the optical power monitor.

22 Claims, 11 Drawing Sheets

(56) References Cited

U.S. PATENT DOCUMENTS

| | | |
|---|---|---|
| 2006/0005216 A1 | 1/2006 | Rausch |
| 2006/0233061 A1 | 10/2006 | Rausch et al. |
| 2007/0014041 A1 | 1/2007 | Lille et al. |
| 2007/0081427 A1 | 4/2007 | Suh et al. |
| 2008/0158730 A1 | 7/2008 | Furukawa et al. |
| 2008/0204916 A1 | 8/2008 | Matsumoto et al. |
| 2008/0316872 A1 | 12/2008 | Shimizu et al. |
| 2009/0040645 A1 | 2/2009 | Shimazawa et al. |
| 2009/0059411 A1 | 3/2009 | Tanaka et al. |
| 2009/0225464 A1* | 9/2009 | Juang et al. .............. 360/59 |
| 2009/0303629 A1 | 12/2009 | Nakano et al. |
| 2010/0208378 A1 | 8/2010 | Seigler et al. |
| 2010/0208391 A1 | 8/2010 | Gokemeijer |
| 2011/0228416 A1 | 9/2011 | Sasaki et al. |
| 2011/0228651 A1* | 9/2011 | Gage et al. .............. 369/13.24 |
| 2012/0051196 A1 | 3/2012 | Grobis et al. |
| 2012/0201108 A1 | 8/2012 | Zheng et al. |

OTHER PUBLICATIONS

Patrick Gale, "Estimating Laser Diode Lifetimes and Activation Energy", ILX Lightwave Application Note 33, 2008, http://www.ilxlightwave.com/appnotes/AN%2033%20REV01%20Estimating%20Laser%20Diode%20Lifetimes%20&%20Activation%20Energy.pdf.

* cited by examiner

INTEGRATED SENSOR FOR MONITORING LASER POWER IN A HEAT ASSISTED MAGNETIC RECORDING DISK DRIVE

BACKGROUND

Conventional heat assisted magnetic recording (HAMR) disk drives typically include a laser coupled to a HAMR transducer. The HAMR transducer generally includes a conventional waveguide for directing light from the laser to a near field transducer (NFT) near the air-bearing surface (ABS). The NFT utilizes local resonances in surface plasmons to focus the light on a region of the magnetic recording media. As the media is heated, a pole applies a magnetic field to the region of the media and data are written to the media. The conventional HAMR disk drive may also include a photodiode that is used to monitor the laser power. For example, the conventional waveguide may be configured to provide light first to the NFT, then to a photodiode mounted on the slider. In other conventional systems, the photodiode may be directly coupled with the laser.

Although the conventional HAMR transducer may function, the trend in magnetic recording is to higher densities and smaller components. Accordingly, what is needed is an improved HAMR transducer that may be used at higher densities.

SUMMARY

A heat-assisted magnetic recording (HAMR) transducer is coupled with a laser for providing energy and has an air-bearing surface (ABS) configured to reside in proximity to a media during use. The HAMR transducer includes a waveguide optically coupled with the laser and an optical power monitor. The waveguide directs energy from the laser toward the media. The optical power monitor is optically coupled with the waveguide. The optical power monitor for captures a portion of the energy, converts the portion of the energy to heat and measures a local temperature proximate to the optical power monitor.

DETAILED DESCRIPTION OF THE PREFERRED EMBODIMENTS

Figure 1:
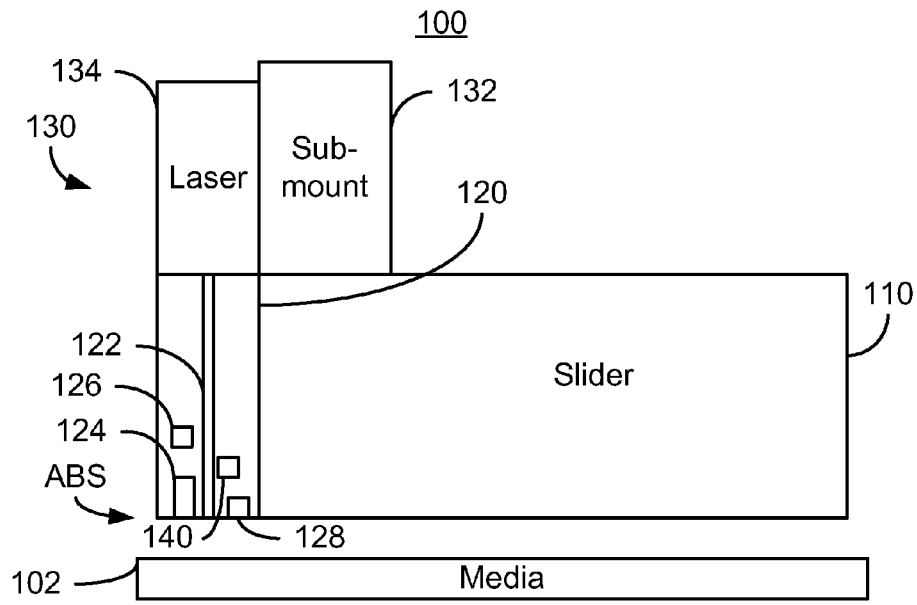
FIG. 1 depicts an exemplary embodiment of a heat assisted magnetic recording disk drive including an optical power monitor.

FIG. 1 depicts a side view of an exemplary embodiment of a portion of a heat assisted magnetic recording (HAMR) disk drive. For clarity, FIG. 1 is not to scale. For simplicity not all portions of the HAMR disk drive 100 are shown. In addition, although the HAMR disk drive 100 is depicted in the context of particular components other and/or different components may be used. For simplicity, only single components 102, 110, 120, 130 and 140 are shown. However, multiples of each components 102, 110, 120, 130 and/or 140 and their subcomponents, might be used.

The HAMR disk drive 100 includes media 102, a slider 110, a HAMR transducer 120 and a laser assembly 130. Additional and/or different components may be included in the HAMR disk drive 100. The slider 110, and thus the laser assembly 130 and HAMR transducer 120 are generally attached to a suspension (not shown). The HAMR transducer 120 is fabricated on the slider 110 and includes an air-bearing surface (ABS) proximate to the media 102 during use.

In general, the HAMR transducer 120 includes a write transducer and a read transducer. However, for clarity, only the write portion of the HAMR transducer 120 is shown. The HAMR transducer 120 includes a waveguide 122, write pole 124, coil(s) 126 and near-field transducer (NFT) 128, which resides near the ABS. In other embodiments, different and/or additional components may be used in the HAMR transducer 120. The waveguide 122 guides light toward the media and, in the embodiment shown, to the NFT 128. The NFT 128 utilizes local resonances in surface plasmons to focus the light to magnetic recording media 102. At resonance, the NFT 128 couples the optical energy of the surface plasmons efficiently into the recording medium layer of the media 102 with a confined optical spot which is much smaller than the optical diffraction limit.

The laser assembly 130 includes a submount 132 and a laser 134. The submount 132 is a substrate to which the laser 134 may be affixed for improved mechanical stability, ease of manufacturing and better robustness. The laser 134 may be a chip such as a laser diode. Thus, the laser 134 typically includes at least a resonance cavity, a gain reflector on one end of the cavity, a partial reflector on the other end of the cavity and a gain medium. For simplicity, these components of the laser 134 are not shown in FIG. 1.

The HAMR transducer 100 also includes an optical power monitor 140. The optical power monitor 140 captures a portion of the energy in the waveguide 122, converts this captured portion of the energy to heat and measures a local temperature at or near the optical power monitor 140. To capture the energy of the waveguide 122, the optical power monitor 140 resides sufficiently close to the core of the waveguide 122. In some embodiments, the optical power monitor 140 is at least one hundred and not more than six hundred nanometers from the core. In some such embodiments, the optical power monitor 140 is at least one hundred fifty and not more than four hundred nanometers from the core. The optical power monitor 140 may be desired to be spaced apart from the core so that the optical power monitor does not unduly interfere with the efficiency of the waveguide 122. However, in other embodiments, the optical power monitor 140 may adjoin the core of the waveguide 122.

In some embodiments, the optical power monitor 140 may include multiple components. For example, the optical power monitor 140 may include an absorber that captures energy from the waveguide 122 and a temperature sensor that measures the local temperature. In other embodiments, the energy capture and temperature measurement may be provided by a single component. In some embodiments, the optical power monitor 140 may provide a differential measurement of the temperature. The optical power monitor 140 may thus be used with a second temperature sensor (not shown in FIG. 1) distal from the waveguide 122. Thus, the change in temperature from a baseline temperature of the transducer 120 may be determined.

The measurement of the local temperature at or near the optical power monitor 140 is indicative of the heat generated by the optical power monitor 140 and, therefore, the amount of energy coupled into the optical power monitor 140 from the waveguide 122. In some embodiments, a specific percentage of the energy in the waveguide 122 is capture by the optical power monitor 140. For example, the optical power monitor 140 may capture at least one percent and not more than seventy percent of the energy in the waveguide 122. In some embodiments, at least three and not more than ten percent of the waveguide energy is captured by the optical power monitor 140. The energy in the waveguide 122 may thus be determined based upon the temperature measured by the optical power monitor 140. Therefore, the energy output by the laser 134 may be determined.

The optical power monitor 140 allows the power delivered by the laser 134 to be monitored. Thus, the power to the laser 134 may be adjusted in order to provide the desired power to the HAMR transducer 120 and, therefore, the media 102. Thus, the HAMR disk drive 100 may have improved performance. Further, the optical power monitor 140 is integrated into the HAMR transducer 120. The optical power monitor 140 may be fabricated using techniques that are analogous to those used in forming the remaining portions of the HAMR transducer 120. Thus, the optical power monitor 140 may be used in higher density HAMR disk drives. The performance of a higher density disk drive may be improved.

Figure 2:
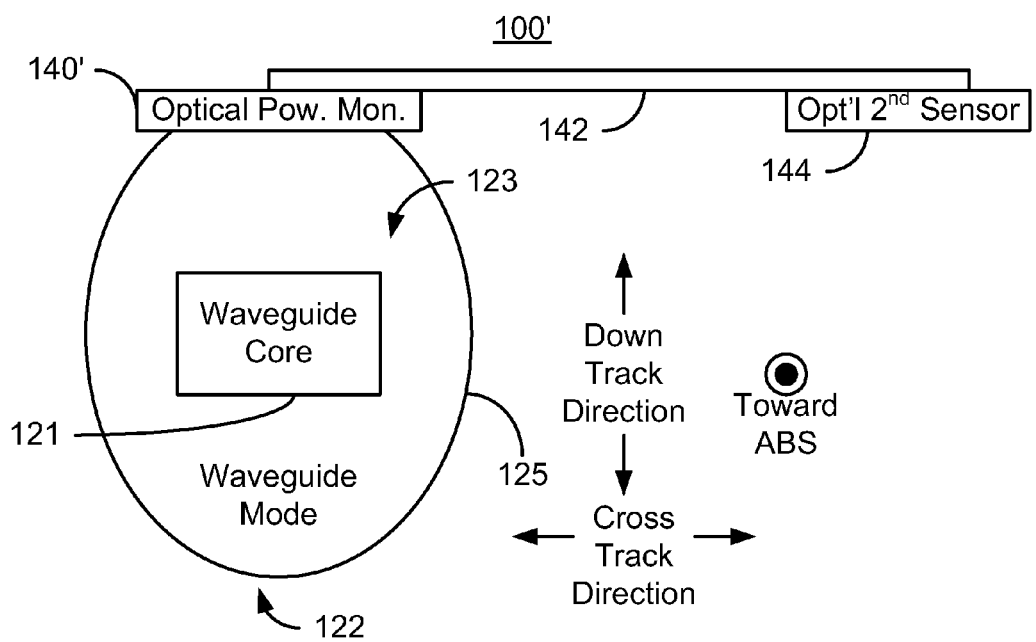
FIG. 2 depicts an exemplary embodiment of a portion of a heat assisted magnetic recording transducer including an optical power monitor.

FIG. 2 depicts an exemplary embodiment of a portion of the HAMR disk drive 100' including the optical power monitor 140'. For clarity, FIG. 2 is not to scale. For simplicity not all portions of the HAMR disk drive 100' are shown. In addition, although the optical power monitor 140' is depicted in the context of particular components other and/or different components may be used. The HAMR disk drive 100' is analogous to the HAMR disk drive 100 depicted in FIG. 1. Thus, similar components have analogous labels. The optical power monitor 140' is analogous to the optical power monitor 140. The optical power monitor 140' is thus optically coupled with the waveguide 122, captures a portion of the energy carried by the waveguide 122, converts the captured energy to heat and measures a local temperature. The HAMR disk drive 100' also includes a lead 142 and an optional additional temperature sensor 144.

The waveguide 122 is analogous to the waveguide 122 depicted in FIG. 1. The waveguide 122 is shown as including a waveguide core 121 and cladding 123. Further, the waveguide mode 125 is depicted. The waveguide mode 125 is the optical energy from the laser being directed by the waveguide 122 toward the ABS (not shown in FIG. 2). Note that the waveguide mode 125 extends outside of the core 121 and into the cladding 123.

The optical power monitor 140' is optically coupled with the waveguide 122. In embodiments in which the second temperature sensor 144 is used, the system for monitoring laser power may be considered to include the optical power monitor 140' as well as the additional temperature sensor 144. The optical power monitor 140' captures energy from the waveguide 122, converts the captured energy to heat and measures the local temperature. In some embodiments, the optical power monitor 140' may be a single structure. For example, the optical power monitor 140' may include at least one of a metal, NiCr, a dielectric, carbon, silicon and NiFe. These materials may absorb optical energy (e.g. light) in the wavelength range of the laser 134. Thus, the optical power monitor 140' captures optical energy in the waveguide 122 and converts the optical energy to heat. Further the materials indicated above have a temperature coefficient of resistivity. As a result, the change in resistivity of such an optical power monitor 140' can also determine the temperature change due to the heat.

In order to capture the energy in the waveguide 122, the optical power monitor 140' is desired to be within the waveguide mode 125. The optical power monitor 140' should also not unduly disturb the ability of the waveguide 122 to transport light. Thus, the optical power monitor 140' may be spaced apart from the waveguide core 121. In some embodiments, the optical power monitor 140' is at least one hundred and not more than six hundred nanometers from the core. In some such embodiments, the optical power monitor 140' is at least one hundred fifty nanometers from the core 121 and not more than four hundred nanometers from the core 121. Considerations such as the mode size, the amount of power removed that the HAMR disk drive can tolerate, and/or the waveguide structure may be used in determining the distance between the optical power monitor 140' and the waveguide core. In addition, the optical power monitor 140' has a width that is substantially the same as the waveguide mode 125. Having a smaller width than the waveguide mode 125 reduces the ability of the optical power monitor 140' to absorb light from the waveguide 122. Having a greater width than the waveguide mode 125 may waste space and material. This width may be not more than one micron. In some embodiments, this width is on the order of five hundred nanometers. The optical power monitor 140' is also desired to be long enough in a direction out of the plane of the page in FIG. 2 to capture the desired amount of energy from the waveguide 122 without adversely affecting performance of the waveguide 122. In some embodiments, the optical power monitor 140' is at least one and not more than eight microns long. In general, the length of the optical power monitor 140' may be determined based on considerations such as a desire to concentrate the heat generated, the desired resistance of the optical power monitor 140', and the distance between the optical power monitor 140' and the waveguide core 121. In some embodiments, the optical power monitor 140' may be configured to capture varying percentages of the light transported by the waveguide 122. For example, as discussed below, the optical power monitor 140' may be a grating configured to couple in a specific percentage of light. For example, in some embodiments, the optical power monitor 140' absorbs at least one percent and not more than seventy percent of the energy transported by the waveguide 122. In other embodiments, the optical power monitor 140' may capture at least three and not more than ten percent of the energy transported by the waveguide 122.

The optical power monitor 140' may be used in conjunction with an additional temperature sensor 144. The temperature sensor 144 is desired to be sufficiently far from the waveguide core 121 that the rise in temperature due to the optical power monitor 140' does not affect the temperature at the temperature sensor 144. Stated differently, the temperature sensor 144 is thermally decoupled from the heat generated by the optical power monitor 140'. In some embodiments, however, the temperature sensor 144 is sufficiently close to the optical power monitor 140' that the background temperature of both 140' and 144 is substantially the same. In some embodiments, the optical power monitor 140' is at least five and not more than ten microns from the additional temperature sensor 144. In some embodiments, the geometry of the optical power monitor 140' and temperature sensor 144 is desired to be similar. For example, the components 140' and 144 may be formed from the same material(s) and in the same layer of the HAMR transducer 120. The size and shape of the components 140' and 144 may also be similar. This may result in similar self-heating, similar response to temperature changes and other features that may assist in isolating temperature changes due to heating from optical energy captured by the optical power monitor 140'. However, in other embodiments, the geometries of the optical power monitor 140' and the temperature sensor 144 may differ.

Use of the optical power monitor 140' and the temperature sensor 144 may provide a differential temperature measurement. If the optical power monitor 140' and temperature sensor 144 are configured as described above, change(s) in temperature of the optical power monitor 140' due to heating from energy captured from the waveguide 122 may be sensed by this differential measurement. This change in temperature can be converted to a laser power based upon the fraction of optical energy captured by the optical power monitor 140'. Thus, the power provided by the laser 134 may be monitored. This information may be fed back to electronics (not shown in FIGS. 1-2) that control the laser 134. As a result, the power output by the laser 134 may be controlled to be in the desired range.

The optical power monitor 140' thus allows power transported by the waveguide 122 to be determined and managed. Thus, the HAMR disk drive 100' may have improved performance. Further, the optical power monitor 140' is integrated into the HAMR transducer 120. The optical power monitor 140' may be fabricated using techniques that are analogous to those used in forming the remaining portions of the HAMR transducer 120. Thus, the optical power monitor 140' may be used in higher density HAMR disk drives. The performance of a higher density disk drive may be improved.

Figure 3:
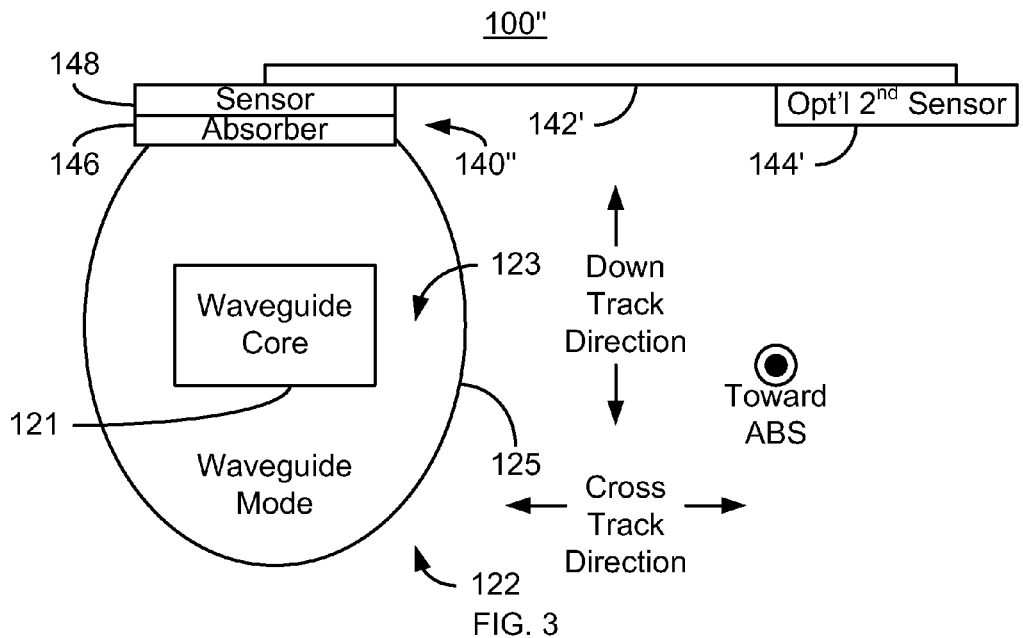
FIG. 3 depicts another exemplary embodiment of a portion of a heat assisted magnetic recording transducer including an optical power monitor.

FIG. 3 depicts another exemplary embodiment of a portion of a HAMR disk drive 100" including an optical power monitor 140". For clarity, FIG. 3 is not to scale. For simplicity not all portions of the HAMR disk drive 100" are shown. In addition, although the optical power monitor 140" is depicted in the context of particular components other and/or different components may be used. The HAMR disk drive 100" is analogous to the HAMR disk drives 100 and 100'. Thus, similar components have analogous labels. The HAMR disk drive 100" thus includes an optical power monitor 140", optional temperature sensor 144' and lead 142' analogous to the optical power monitor 140/140', optional temperature sensor 144 and lead 142. Also shown is the waveguide 122 supporting waveguide mode 125 and having core 121 and cladding 124 that are analogous to those described in FIGS. 1 and 2. The optical power monitor 140" is thus optically coupled with the waveguide 122, captures a portion of the energy carried by the waveguide 122, converts the captured energy to heat and measures a local temperature.

In the embodiment shown in FIG. 3, the optical power monitor 140" has the energy capture and temperature sensing functions split into two structures. Thus, the optical power monitor 140" includes an absorber 146 and a sensor 148. The absorber 146 may be configured to couple in energy in the mode 125 and convert this energy to heat. The absorber 146 may be may include at least one of a metal, NiCr, a dielectric, carbon, silicon and NiFe. The sensor 148 may be a thermistor or other temperature sensor. In the embodiment shown, the absorber 146 adjoins the sensor 148. However, in other embodiments, components 146 and 148 may be spatially separated. The optional sensor 144' is analogous to the sensor 144.

The optical power monitor 140" thus allows power transported by the waveguide 122 to be determined and managed. Thus, the HAMR disk drive 100" may have improved performance. Further, the optical power monitor 140''' is integrated into the HAMR transducer 120. The optical power monitor 140" may be fabricated using techniques that are analogous to those used in forming the remaining portions of the HAMR transducer 120. Thus, the optical power monitor 140" may be used in higher density HAMR disk drives. The performance of a higher density disk drive may be improved.

Figure 4:
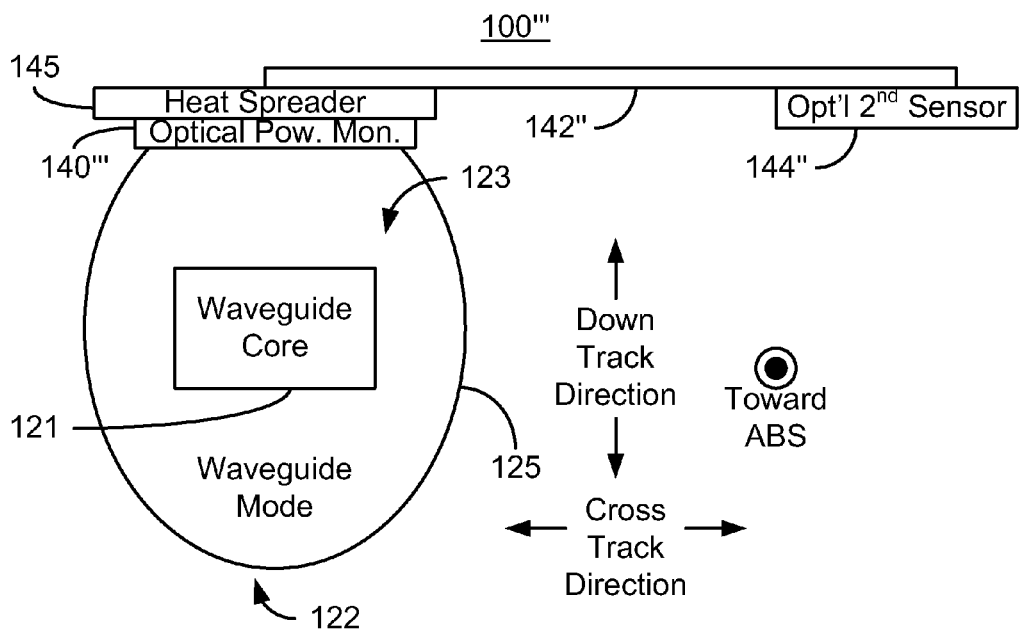
FIG. 4 depicts another exemplary embodiment of a portion of a heat assisted magnetic recording transducer including an optical power monitor.

FIG. 4 depicts another exemplary embodiment of a portion of a HAMR disk drive 100''' including an optical power monitor 140'''. For clarity, FIG. 4 is not to scale. For simplicity not all portions of the HAMR disk drive 100''' are shown. In addition, although the optical power monitor 140''' is depicted in the context of particular components other and/or different components may be used. The HAMR disk drive 100''' is analogous to the HAMR disk drives 100, 100' and 100". Thus, similar components have analogous labels. The HAMR disk drive 100''' thus includes an optical power monitor 140''', optional temperature sensor 144" and lead 142" analogous to the optical power monitor 140/140'/140", optional temperature sensor 144/144' and lead 142/142'. Also shown is the waveguide 122 supporting waveguide mode 125 and having core 121 and cladding 124 that are analogous to those described in FIGS. 1-3. The optical power monitor 140" is thus optically coupled with the waveguide 122, captures a portion of the energy carried by the waveguide 122, converts the captured energy to heat and measures a local temperature. Although shown as a single device, the optical power monitor 140''' may include separate absorbers and sensors.

In the embodiment shown in FIG. 4, the HAMR disk drive 100''' also includes a heat spreader 145. In some embodiments, the heat spreader 145 is simply an Au or other thermally conductive layer deposited on the optical power monitor 140''''. The heat spreader 145 allows heat from the optical power monitor 140''' to be more evenly distributed in the region around the optical power monitor 140''''. As a result, the temperature of the sensor 140''' may be more uniform.

The optical power monitor 140''' thus allows power transported by the waveguide 122 to be determined and managed. Thus, the HAMR disk drive 100" may have improved performance. The optical power monitor 140''' is integrated into the HAMR transducer 120. The optical power monitor 140''' may be fabricated using techniques that are analogous to those used in forming the remaining portions of the HAMR disk drive 100''' and may be used in higher density HAMR disk drives. The performance of a higher density disk drive may be improved.

Figure 5:
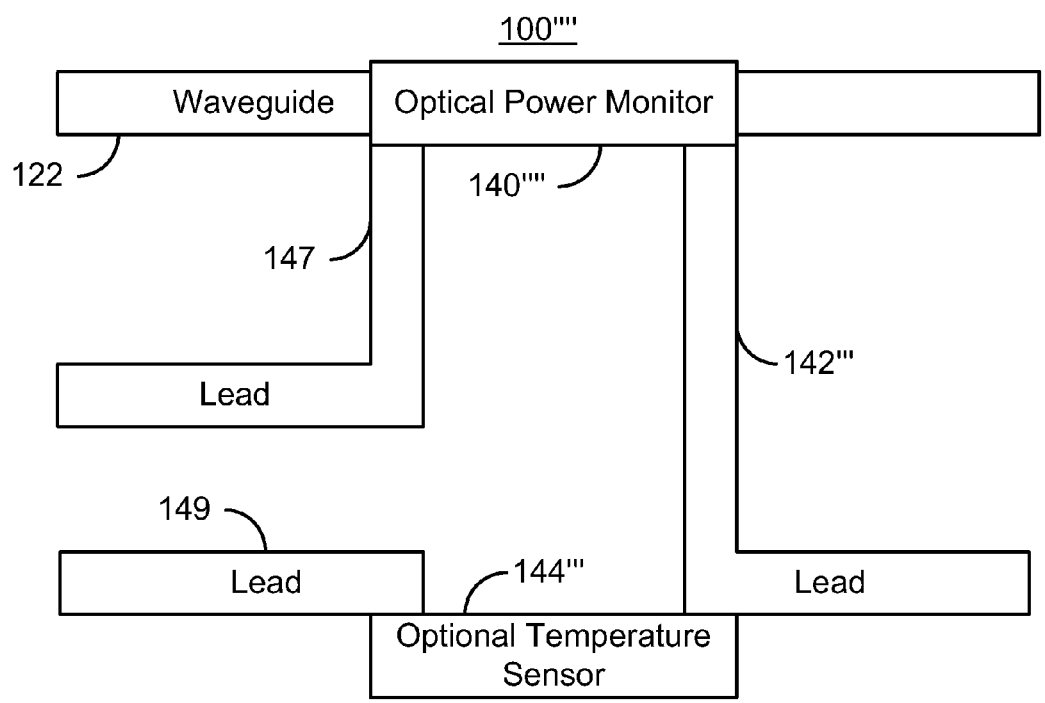
FIG. 5 depicts another exemplary embodiment of a portion of a heat assisted magnetic recording transducer including an optical power monitor.

FIG. 5 depicts another exemplary embodiment of a portion of a HAMR disk drive 100'''' including an optical power monitor 140''''. For clarity, FIG. 5 is not to scale. FIG. 5 is a different view than is shown in FIGS. 2-4. For simplicity not all portions of the HAMR disk drive 100'''' are shown. In addition, although the optical power monitor 140'''' is depicted in the context of particular components other and/or different components may be used. The HAMR disk drive 100'''' is analogous to the HAMR disk drives 100, 100', 100" and/or 100'''. Thus, similar components have analogous labels. The HAMR disk drive 100'''' thus includes an optical power monitor 140'''', optional temperature sensor 144''' and lead 142''' analogous to the optical power monitor 140/140'/140"/140''', optional temperature sensor 144/144'/144" and lead 142/142'/142". Also shown is the waveguide 122 that is analogous to the waveguides described in FIGS. 1-4. The optical power monitor 140'''' is thus optically coupled with the waveguide 122, captures a portion of the energy carried by the waveguide 122, converts the captured energy to heat and measures a local temperature. Although shown as a single device, the optical power monitor 140'''' may include separate absorbers and sensors.

Figure 6:
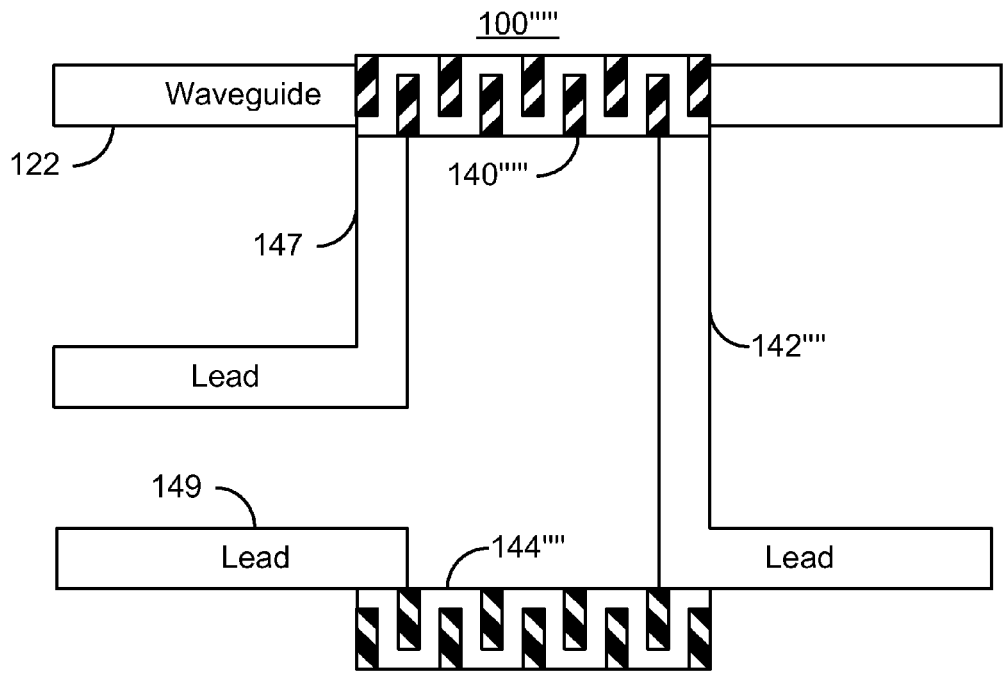
FIG. 6 depicts another exemplary embodiment of a portion of a heat assisted magnetic recording transducer including an optical power monitor.

In the embodiment shown in FIG. 6, leads 142''', 147 and 149 are electrically coupled in a bridge structure that allows for a differential temperature measurement. The leads 142''', 147 and 149 may also be used to conduct heat between the structures 140'''' and 144'''. Thus, the HAMR disk drive 100'''' shares the benefits of the HAMR disk drives 100, 100', 100" and/or 100'''. Further, as mentioned above, the disk drive 100'''' is designed to provide a differential temperature measurement. Thus, the flexibility of the optical power monitor 140'''' may also be enhanced, FIG. 6 depicts another exemplary embodiment of a portion of a HAMR disk drive 100''''' including an optical power monitor 140'''''. For clarity, FIG. 6 is not to scale. For simplicity not all portions of the HAMR disk drive 100''' are shown. In addition, although the optical power monitor 140''''' is depicted in the context of particular components other and/or different components may be used. The HAMR disk drive 100''''' is analogous to the HAMR disk drives 100, 100', 100", 100''' and 100''''. Thus, similar components have analogous labels. The HAMR disk drive 100''''' thus includes an optical power monitor 140''''', optional temperature sensor 144'''' and lead 142'''' analogous to the optical power monitor 140/140'/140"/140''', optional temperature sensor 144/144'/144" and lead 142/142'/142". Also shown is the waveguide 122 that is analogous to the waveguides described in FIGS. 1-5. As a similar view as in FIG. 5 is shown, the leads 147 and 149 are also depicted in FIG. 6. The optical power monitor 140''''' is thus optically coupled with the waveguide 122, captures a portion of the energy carried by the waveguide 122, converts the captured energy to heat and measures a local temperature. Although shown as a single device, the optical power monitor 140''''' may include separate absorbers and sensors.

In the embodiment shown in FIG. 5, the optical power monitor 140''''' is configured as a grating. In embodiments in which separate absorbers and sensors are used in the optical power monitor 140''''', the absorber is configured as the grating 140'''''. In the embodiment shown, the temperature sensor 144'''' is also configured as a grating. This allows the two components 140''''' and 144'''' to have a similar geometry. However, in other embodiments, the components 140''''' and 144'''' may be configured differently. For example, the temperature sensor 144'''' may not be a grating. The optical power monitor 140''''' may be a metal grating interspersed with insulators (cross hatched). The pitch of the grating 140''''' as well as other features of the grating 140''''' may be selected to tune the grating 140''''' for various goals. For example, using the wavelength of light transported by the waveguide 122, the pitch may be selected to couple in the desired fraction of light into the optical power monitor 140'''''. The sensitivity of the optical power monitor 140''''' may thus be tuned. The reflection, absorption, transmission and diffraction of light by the grating 140''''' may likewise be tuned.

The optical power monitor 140''''' thus allows power transported by the waveguide 122 to be determined and managed. Thus, the HAMR disk drive 100''''' may have improved performance. The optical power monitor 140''''' is integrated into the HAMR transducer 120. The optical power monitor 140''''' may be fabricated using techniques that are analogous to those used in forming the remaining portions of the HAMR disk drive 100''''' and may be used in higher density HAMR disk drives. The performance of a higher density disk drive may be improved. In addition, the sensitivity and other features of the optical power monitor 140''''' may be tuned through the grating. Thus, the flexibility of the optical power monitor 140''''' may also be enhanced. Further, although specific features are highlighted in FIGS. 1-6, one or more of the features of the HAMR disk drives 100, 100', 100", 100''', 100'''' and/or 100''''' may be combined.

Figure 7:
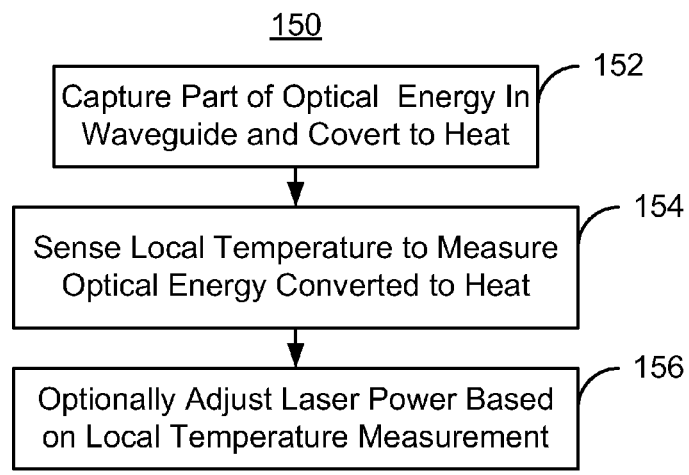
FIG. 7 is a flow chart depicting an exemplary embodiment of a method for monitoring laser power in a heat assisted magnetic recording disk drive.

FIG. 7 is a flow chart depicting an exemplary embodiment of a method 150 for monitoring laser power in a HAMR disk drive. For simplicity, some steps may be omitted, performed in another order, interleaved with other steps and/or combined. The method 150 is described in the context the HAMR disk drive 100. However, the method 150 may be used to in conjunction with other disk drives including but not limited to the HAMR disk drives 100', 100", 100''', 100'''' and/or 100'''''.

A portion of the energy being transported in the waveguide 122 is captured and converted to heat in the optical power monitor 140, via step 152. The local temperature is also sensed, via step 154. Step 154 includes determining the temperature at the optical power monitor 140. In some embodiments, step 154 may include performing a differential temperature measurement in connection with another temperature sensor 144, 144', 144", 144''' and/or 144''''. The differential temperature measurement provides an indication of the power delivered by the waveguide 122 and the laser 134.

In addition, the laser power may optionally be adjusted based on the local temperature sensed by the optical power monitor, via step 156. Step 156 may include increasing and/or decreasing the current to the laser 134 in order to adjust the output.

Using the method 150, the power to the laser may be controlled. Thus, performance of the HAMR disk drives 100, 100', 100", 100''', 100'''' and/or 100''''' may be improved.

Figure 8:
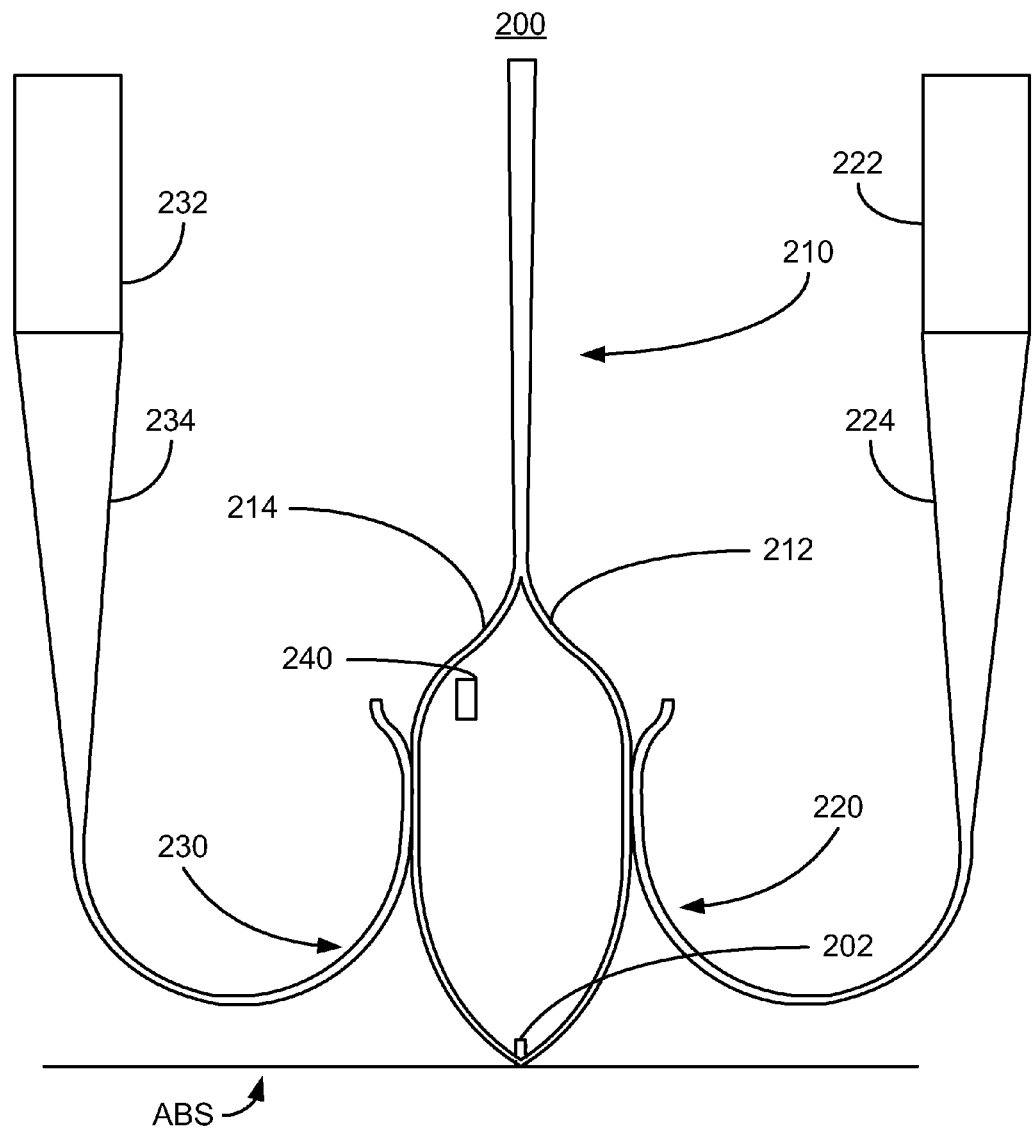
FIG. 8 depicts another exemplary embodiment of a portion of a heat assisted magnetic recording transducer including an optical power monitor.

FIGS. 8-13 depict exemplary embodiments of some possible locations of optical power monitors. FIG. 8 depicts another exemplary embodiment of a portion of a HAMR disk drive 200 including an optical power monitor 240. For clarity, FIG. 8 is not to scale. For simplicity not all portions of the HAMR disk drive 200 are shown. The HAMR disk drive 200 is analogous to the HAMR disk drives 100, 100', 100", 100"', 100"" and/or 100""'. Thus, similar components have analogous labels. The HAMR disk drive 200 thus includes a waveguide 210 and an optical power monitor 240 analogous to the waveguide 122 and optical power monitor 140/140'/ 140"/140"'/140""/140""', respectively. The HAMR disk drive 200 indicates a particular type of waveguide 210 as well as a possible location of the optical power monitor 240.

The waveguide 210 is an interferometric tapered waveguide (ITWG) including two arms 212 and 214 that direct light toward the NFT 202 at the ABS. Also shown are two tapping waveguides 220 and 230 either or both of which may be omitted. The tapping waveguide 220 includes an inverse taper 224 and an output grating 222. The tapping waveguide 230 includes an inverse tape 234 and an output grating 232. In some embodiments, the tapping waveguides 220 and/or 230 are used to tap a portion of the light from the waveguide 210.

The optical power monitor 240 is indicated as being located after the ITWG has been split into arms 212 and 214. The optical power monitor 240 is depicted as being located closer to the arm 214 and near the split. Thus, the optical power monitor 240 may absorb light from the arm 214 of the waveguide 210. In other embodiments, the optical power monitor 240 may be close to the arm 212 and may absorb light from the arm 212 instead. The optical power monitor 240 may be located along any portion of the arm 212 and/or 214. Further, although only one optical power monitor 240 is shown, multiple optical power monitors 240 may be used.

The optical power monitor 240 thus allows power transported by the waveguide 210 to be determined and managed. Thus, the HAMR disk drive 200 may have improved performance. The optical power monitor 240 is integrated into the HAMR disk drive 200. The optical power monitor 240 may be fabricated using techniques that are analogous to those used in forming the remaining portions of the HAMR disk drive 200 and may be used in higher density HAMR disk drives. The performance of a higher density disk drive may be improved. In addition, the sensitivity and other features of the optical power monitor 200 may be tuned through a grating. Thus, the flexibility of the optical power monitor 240 may also be enhanced.

Figure 9:
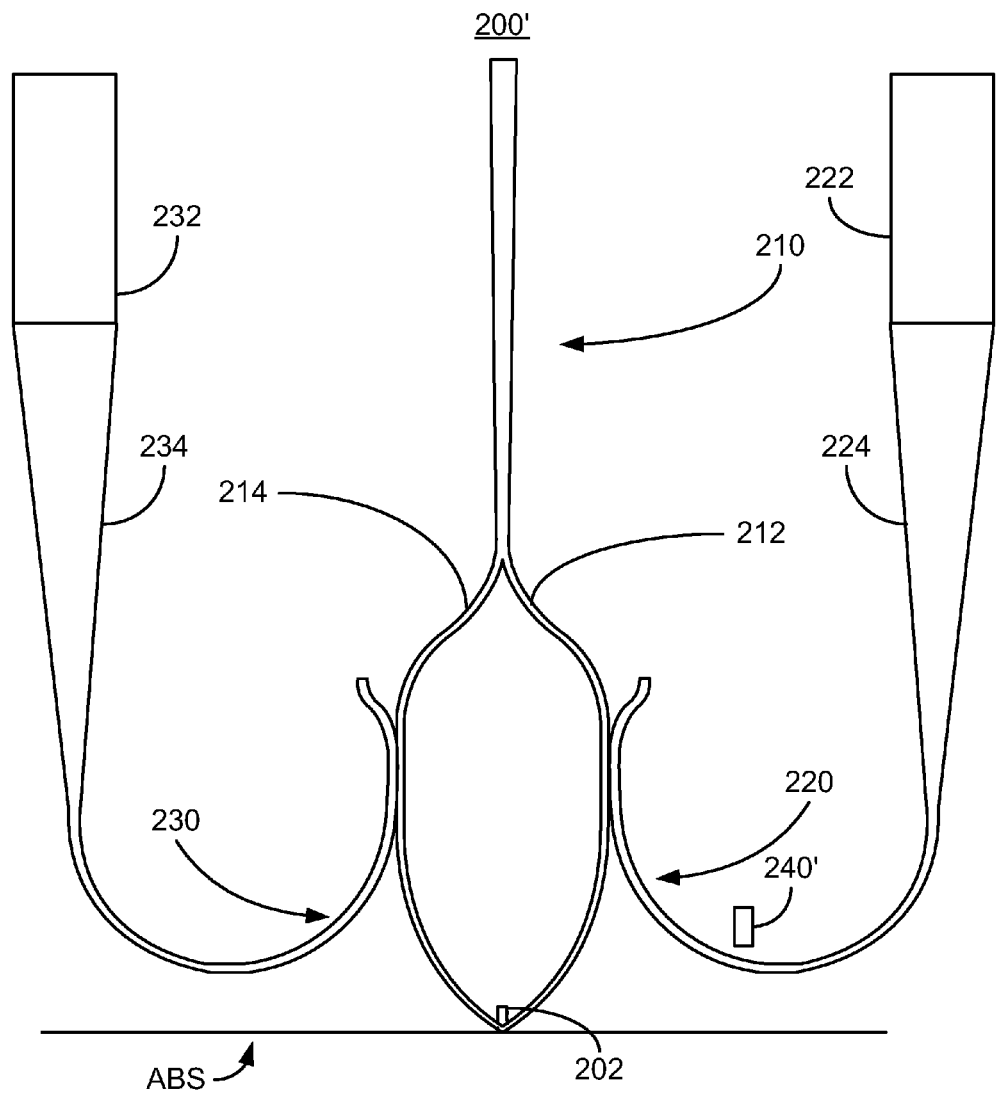
FIG. 9 depicts another exemplary embodiment of a portion of a heat assisted magnetic recording transducer including an optical power monitor.

FIG. 9 depicts another exemplary embodiment of a portion of a HAMR disk drive 200' including an optical power monitor 240'. For clarity, FIG. 9 is not to scale. For simplicity not all portions of the HAMR disk drive 200' are shown. The HAMR disk drive 200' is analogous to the HAMR disk drives 200, 100, 100', 100", 100"', 100"" and/or 100""'. Thus, similar components have analogous labels. The HAMR disk drive 200' thus includes an ITWG 210 and an optical power monitor 240' analogous to the waveguide 210/122 and optical power monitor 240/140/140'/140"/140"'/140""/140""', respectively. The HAMR disk drive 200' indicates a particular type of waveguide 210 as well as a possible location of the optical power monitor 240'. Also shown are NFT 202 and tapping waveguides 220 and 230.

The optical power monitor 240' is indicated as being located along the tapping waveguide 220 between the ITWG 210 and the inverse taper 244. Thus, the optical power monitor 240' may absorb light from the tapping waveguide 220. In some embodiments, therefore, the optical power monitor 240' may capture a higher fraction of light in the waveguide. This is because the tapping waveguide 220 typically taps only a portion of the light in the arm 212 of the waveguide 210. In other embodiments, the optical power monitor 240' may be close to the tapping waveguide 230, which taps light from the arm 214. Further, the optical power monitor 240' may be located along any portion of the tapping waveguide 220 and/or 230. In embodiments in which the optical power monitor 240' is configured as a grating, the optical power monitor 240' may be part of or replace grating 222 and/or 232. However, the optical power monitor 240' is generally desired to be between the location at which the tapping waveguide 220/230 is coupled to the arm 212/214 and the inverse taper 224/234. Further, although only one optical power monitor 240' is shown, multiple optical power monitors 240' may be used.

The optical power monitor 240' thus allows power transported by the waveguide 210' to be determined and managed. Thus, the HAMR disk drive 200' may have improved performance. The optical power monitor 240' is integrated into the HAMR disk drive 200'. The optical power monitor 240' may be fabricated using techniques that are analogous to those used in forming the remaining portions of the HAMR disk drive 200' and may be used in higher density HAMR disk drives. The performance of a higher density disk drive may be improved. In addition, the sensitivity and other features of the optical power monitor 200' may be tuned through a grating. Thus, the flexibility of the optical power monitor 240' may also be enhanced.

Figure 10:
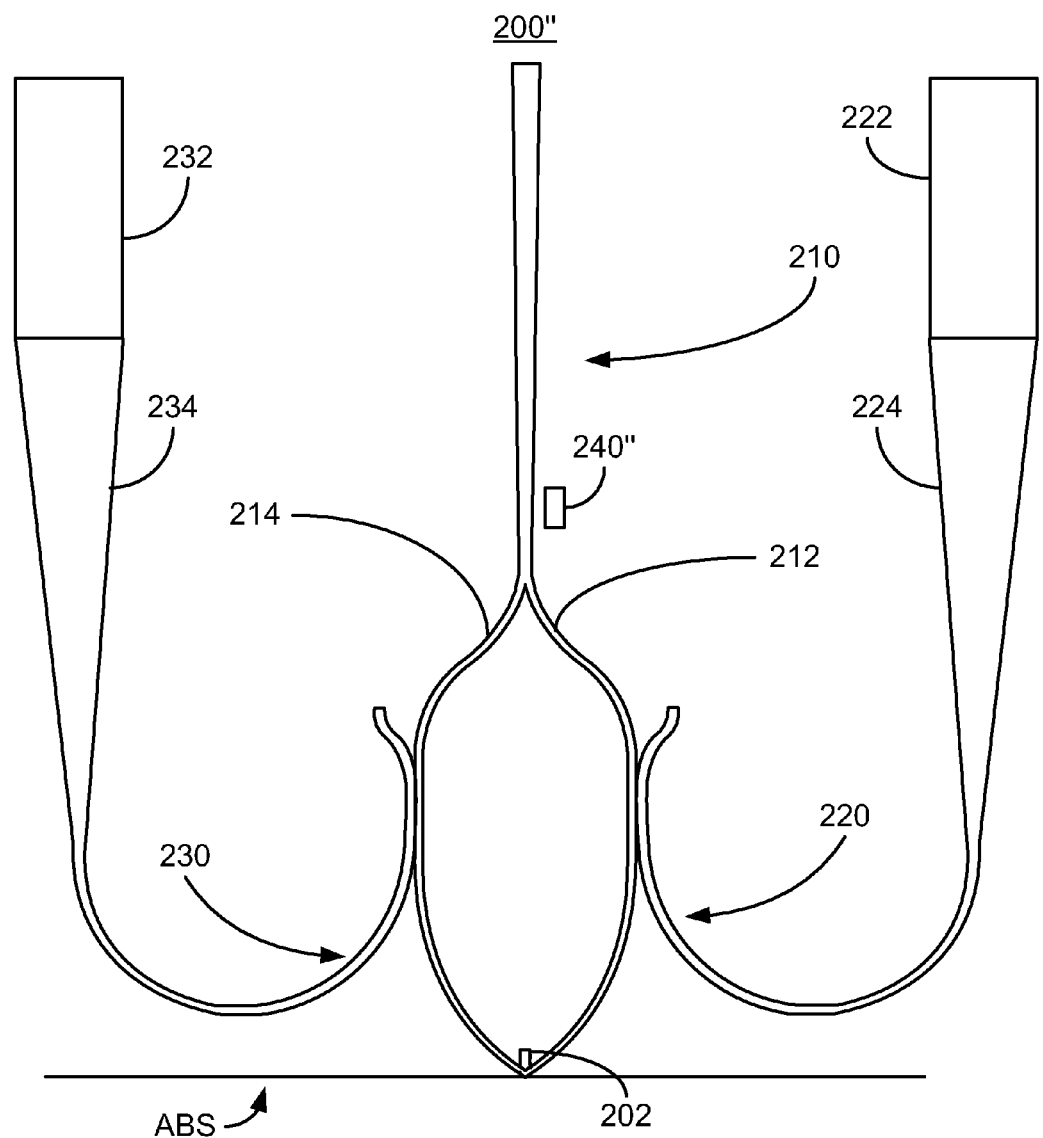
FIG. 10 depicts another exemplary embodiment of a portion of a heat assisted magnetic recording transducer including an optical power monitor.

FIG. 10 depicts another exemplary embodiment of a portion of a HAMR disk drive 200" including an optical power monitor 240". For clarity, FIG. 10 is not to scale. For simplicity not all portions of the HAMR disk drive 200" are shown. The HAMR disk drive 200" is analogous to the HAMR disk drives 200, 200', 100, 100', 100", 100"', 100"" and/or 100""'. Thus, similar components have analogous labels. The HAMR disk drive 200" thus includes a waveguide 210" and an optical power monitor 240" analogous to the waveguide 201/210'/122 and optical power monitor 240/240'/140/140'/140"/140"'/140""/140""', respectively. The HAMR disk drive 200" indicates a particular type of waveguide 210" as well as a possible location of the optical power monitor 240".

The optical power monitor 240" is indicated as being located before after the ITWG has been split into arms 212 and 214. Further, although only one optical power monitor 240" is shown, multiple optical power monitors 240 may be used.

The optical power monitor 240" thus allows power transported by the waveguide 210" to be determined and managed. Thus, the HAMR disk drive 200' may have improved performance. The optical power monitor 240" is integrated into the HAMR disk drive 200". The optical power monitor 240" may be fabricated using techniques that are analogous to those used in forming the remaining portions of the HAMR disk drive 200" and may be used in higher density HAMR disk drives. The performance of a higher density disk drive may be improved. In addition, the sensitivity and other features of the optical power monitor 200" may be tuned through a grating. Thus, the flexibility of the optical power monitor 240" may also be enhanced.

Figure 11:
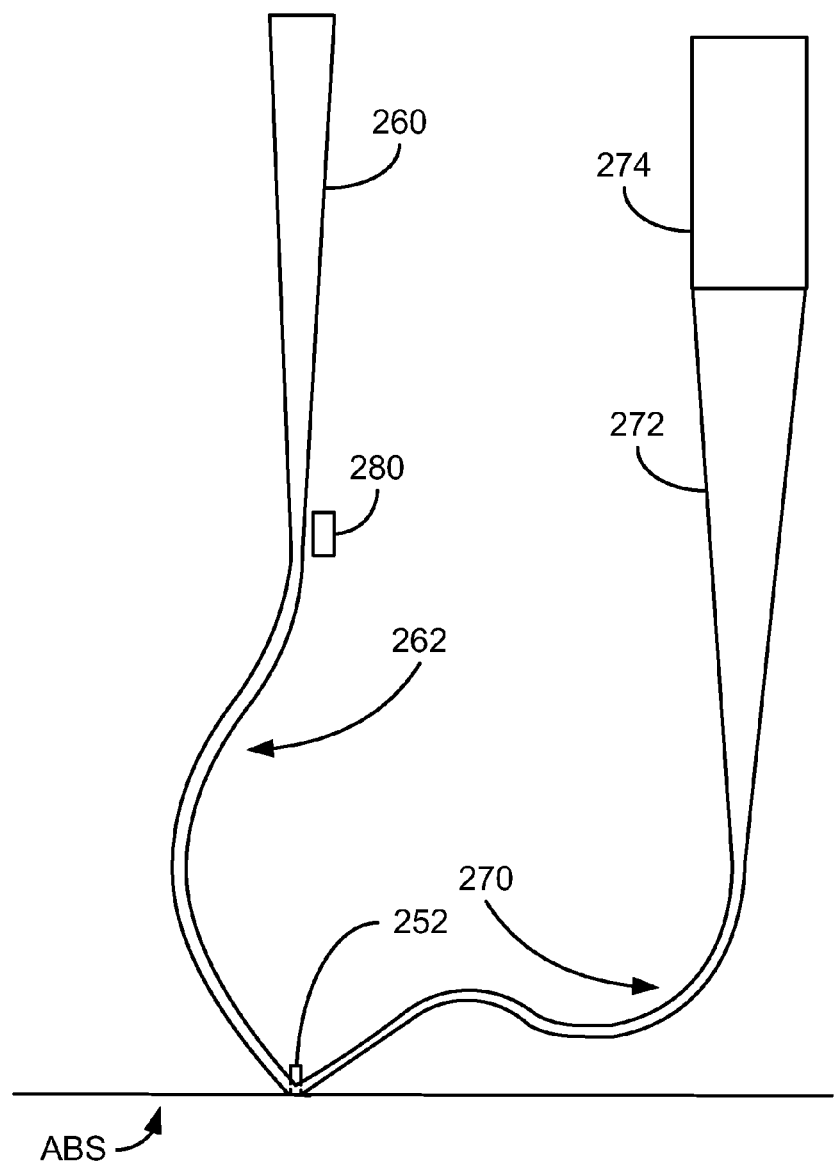
FIG. 11 depicts another exemplary embodiment of a portion of a heat assisted magnetic recording transducer including an optical power monitor.

FIG. 11 depicts another exemplary embodiment of a portion of a HAMR disk drive 250 including an optical power monitor 280. For clarity, FIG. 11 is not to scale. For simplicity not all portions of the HAMR disk drive 250 are shown. The HAMR disk drive 250 is analogous to the HAMR disk drives 100, 100', 100", 100"', 100"" and/or 100""'. Thus, similar components have analogous labels. The HAMR disk drive 250 thus includes a waveguide 260 and an optical power monitor 280 analogous to the waveguide 122 and optical power monitor 140/140'/140"/140"'/140""/140""', respectively. The HAMR disk drive 250 indicates a particular type of waveguide 260 as well as a possible location of the optical power monitor 280.

The waveguide 250 is a tapered waveguide that directs light toward the NFT 252. In addition, the waveguide 260 includes an additional region 270 that directs light from the NFT toward an inverse taper 272 and output grating 274.

The optical power monitor 280 is indicated as being located after the taper and before curved region 262 of the waveguide 260. Thus, the optical power monitor 280 may absorb light from the waveguide 260. Although only one optical power monitor 280 is shown, multiple optical power monitors 280 may be used.

The optical power monitor 280 thus allows power transported by the waveguide 260 to be determined and managed. Thus, the HAMR disk drive 250 may have improved performance. The optical power monitor 280 is integrated into the HAMR disk drive 250. The optical power monitor 280 may be fabricated using techniques that are analogous to those used in forming the remaining portions of the HAMR disk drive 250 and may be used in higher density HAMR disk drives. The performance of a higher density disk drive may be improved. In addition, the sensitivity and other features of the optical power monitor 250 may be tuned through a grating. Thus, the flexibility of the optical power monitor 280 may also be enhanced.

Figure 12:
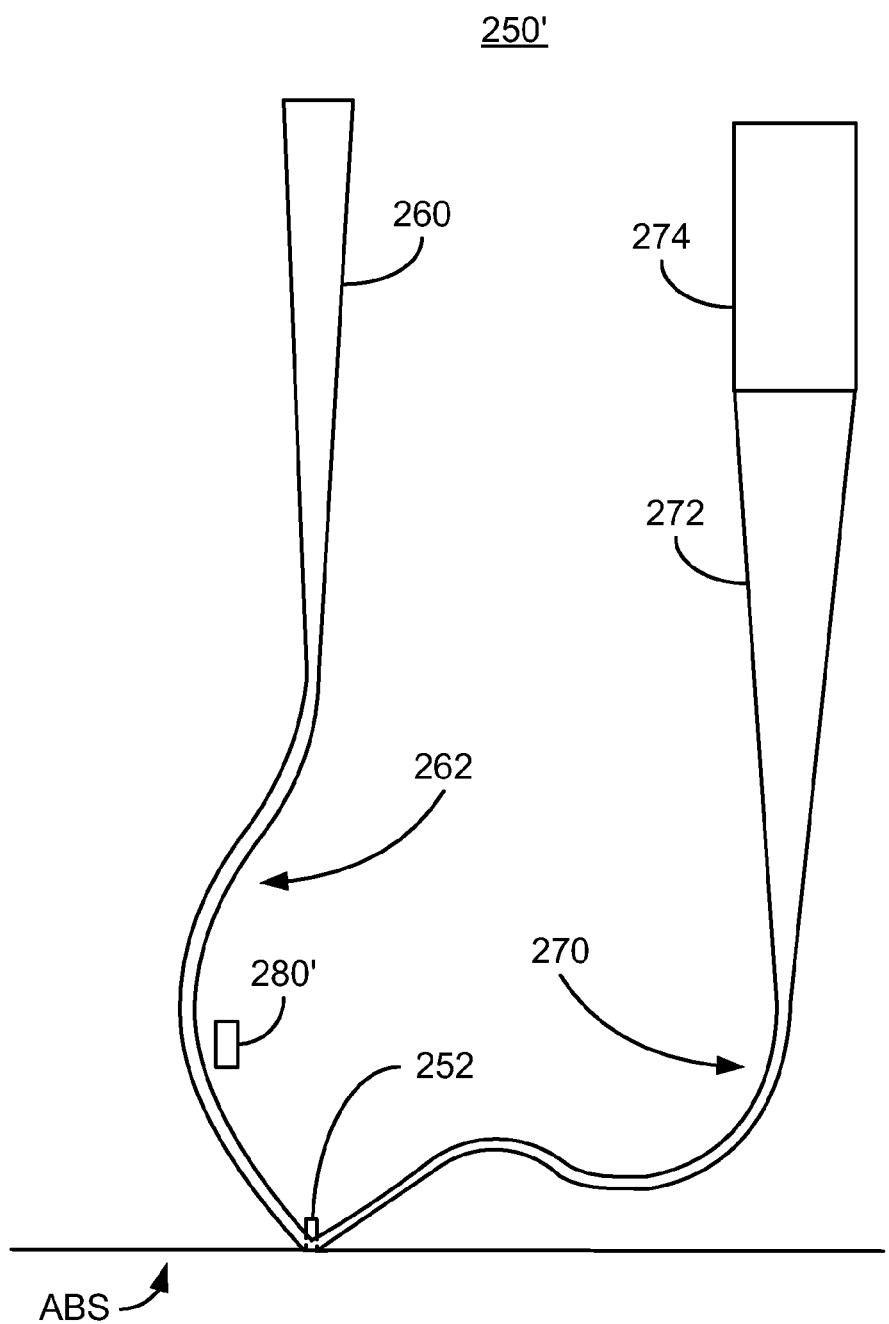
FIG. 12 depicts another exemplary embodiment of a portion of a heat assisted magnetic recording transducer including an optical power monitor.

FIG. 12 depicts another exemplary embodiment of a portion of a HAMR disk drive 250' including an optical power monitor 280'. For clarity, FIG. 12 is not to scale. For simplicity not all portions of the HAMR disk drive 250' are shown. The HAMR disk drive 250' is analogous to the HAMR disk drives 250, 100, 100', 100", 100'", 100"" and/or 100""'. Thus, similar components have analogous labels. The HAMR disk drive 250' thus includes a waveguide 260 and an optical power monitor 280' analogous to the waveguide 122/260 and optical power monitor 280/140/140'/140"/140'"/140""/140""', respectively. The HAMR disk drive 250' indicates a particular type of waveguide 260 as well as a possible location of the optical power monitor 280'.

The optical power monitor 280' is indicated as being located after the taper and along curved region 262 of the waveguide 260. Thus, the optical power monitor 280' may absorb light from the waveguide 260. The optical power monitor 280' may be located at any portion of the curved region 262. Although only one optical power monitor 280' is shown, multiple optical power monitors 280' may be used.

The optical power monitor 280' thus allows power transported by the waveguide 260 to be determined and managed. Thus, the HAMR disk drive 250' may have improved performance. The optical power monitor 280' is integrated into the HAMR disk drive 250'. The optical power monitor 280' may be fabricated using techniques that are analogous to those used in forming the remaining portions of the HAMR disk drive 250' and may be used in higher density HAMR disk drives. The performance of a higher density disk drive may be improved. In addition, the sensitivity and other features of the optical power monitor 250' may be tuned through a grating. Thus, the flexibility of the optical power monitor 280' may also be enhanced.

Figure 13:
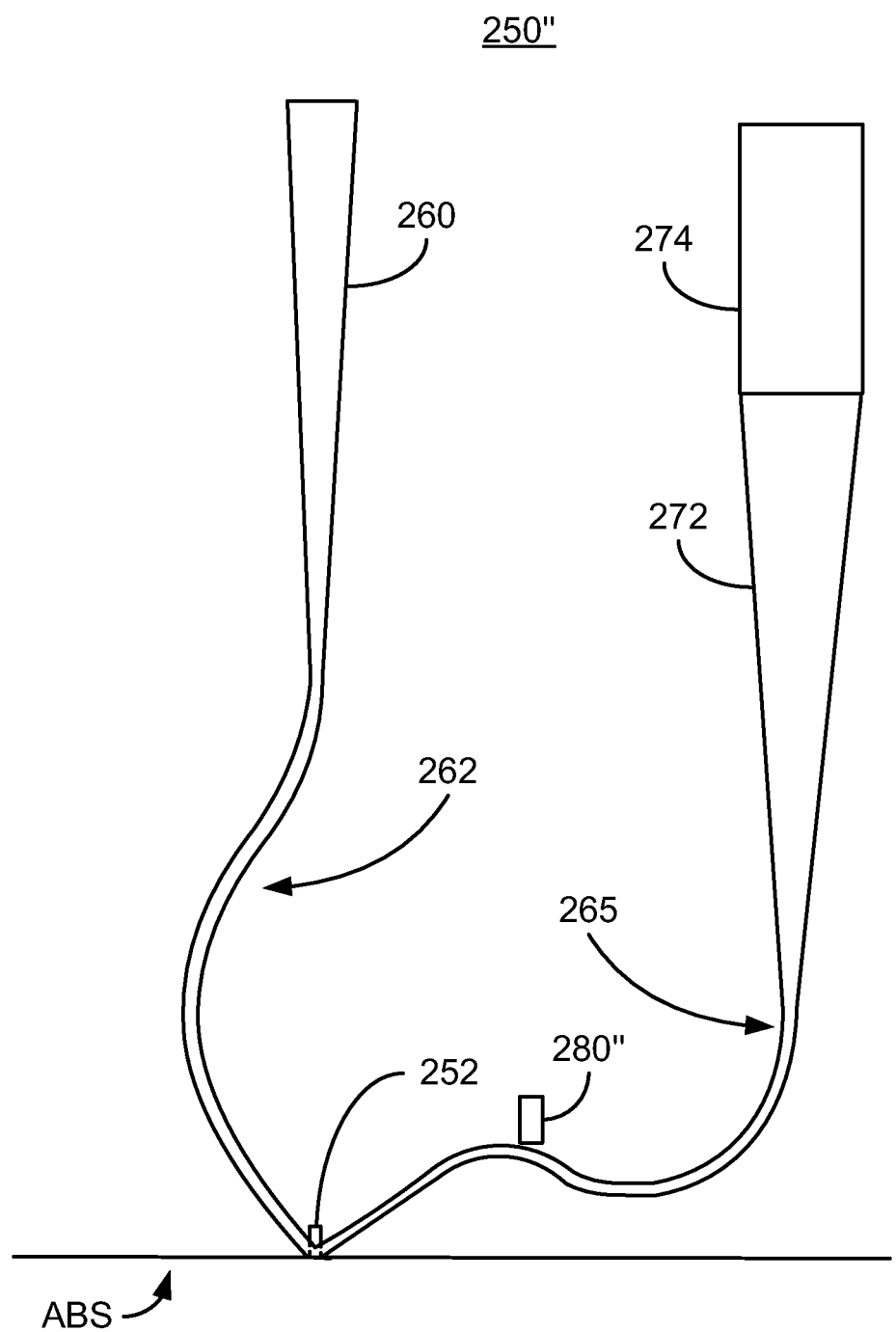
FIG. 13 depicts another exemplary embodiment of a portion of a heat assisted magnetic recording transducer including an optical power monitor.

FIG. 13 depicts another exemplary embodiment of a portion of a HAMR disk drive 250" including an optical power monitor 280". For clarity, FIG. 13 is not to scale. For simplicity not all portions of the HAMR disk drive 250" are shown. The HAMR disk drive 250" is analogous to the HAMR disk drives 250, 250', 100, 100', 100", 100'", 100"" and/or 100""'. Thus, similar components have analogous labels. The HAMR disk drive 250" thus includes a waveguide 260 and an optical power monitor 280" analogous to the waveguide 122/260 and optical power monitor 280/280'/140/140'/140"/140'"/140""/140""', respectively. The HAMR disk drive 250" indicates a particular type of waveguide 260 as well as a possible location of the optical power monitor 280".

The optical power monitor 280" is indicated as being located after the NFT 252 and along curved region 265 and before the inverse taper 272. Thus, the optical power monitor 280" may absorb light from the waveguide 265. Although only one optical power monitor 280" is shown, multiple optical power monitors 280" may be used. In addition, the optical power monitor 280" may be located at any position along the curved region 265 between the NFT 252 and the inverse taper 272. Further, if the optical power monitor 280" is configured as a grating, the optical power monitor may be part of or replace the grating 274.

The optical power monitor 280" thus allows power transported by the waveguide 260 to be determined and managed. Thus, the HAMR disk drive 250' may have improved performance. The optical power monitor 280' is integrated into the HAMR disk drive 250. The optical power monitor 280' may be fabricated using techniques that are analogous to those used in forming the remaining portions of the HAMR disk drive 250' and may be used in higher density HAMR disk drives. The performance of a higher density disk drive may be improved. In addition, the sensitivity and other features of the optical power monitor 250' may be tuned through a grating. Thus, the flexibility of the optical power monitor 280" may also be enhanced.

Figure 14:
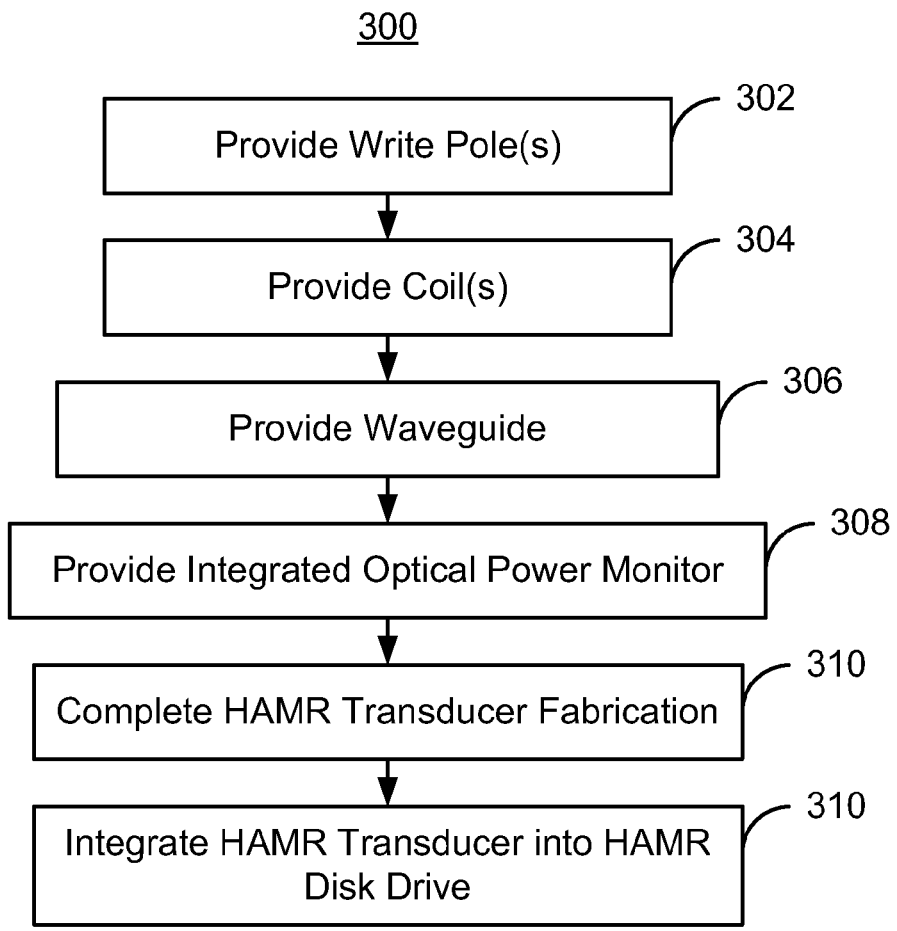
FIG. 14 is a flow chart depicting an exemplary embodiment of a method for fabricating a portion of a heat assisted magnetic recording transducer including an optical power monitor.

FIG. 14 is a flow chart depicting an exemplary embodiment of a method 300 for fabricating HAMR disk drives including optical power monitors. For simplicity, some steps may be omitted, performed in another order, interleaved with other steps and/or combined. The magnetic recording transducer being fabricated may be part of a merged head that also includes a read head (not shown) and resides on a slider (not shown) in a disk drive. The method 300 is described in the context of forming a single transducer 120 in a disk drive 100. However, the method 300 may be used to fabricate multiple transducers at substantially the same time. Further, the method 300 may be used in fabricating other disk drives including but not limited to the disk drives 100', 100", 100'", 100"", 100""', 200, 200', 200", 250, 250' and/or 250". The method 300 and system are also described in the context of particular layers. However, in some embodiments, such layers may include multiple sub-layers. The method 300 also may commence after formation of other portions of the magnetic recording transducer.

A write pole configured to write to a region of the media 102 is provided, via step 302. Step 302 typically includes multiple substeps that form the pole 124. One or more write coils 126 are provided, via step 304. A waveguide 122 optically coupled with the laser 132 is provided, via step 306. Step 306 typically includes depositing cladding and core layers for the waveguide 122 and defining the waveguide 122 using photolithography. The integrated optical power monitor 140 is fabricated during fabrication of the transducer 120, via step 308. Step 308 may include providing the optical power monitor 140, 140', 140", 140'", 140"", 140""', 240, 240', 240", 280, 280', and/or 280". Thus, an optical power monitor, absorber and sensor layers, a grating and/or other portions of the optical power monitor may be fabricated. Further, the optical power monitor 140 is formed at the desired location in the disk drive 100 in step 308. Step 308 may also include forming a heat spreader and/or an additional temperature sensor for use with the optical power monitor.

Fabrication of the HAMR transducer 120 may be completed, via step 310. For example, an NFT and/or other structures may be provided in step 310. The completed HAMR transducer 120 may be incorporated into a HAMR disk drive 100, via step 312.

Using the method 300, the HAMR disk drives 100, 100', 100", 100''', 100'''', 100''''', 200, 200', 200", 250, 250' and/or 250". Consequently, performance of the HAMR disk drives 100, 100', 100", 100''', 100'''', 100''''', 200, 200', 200", 250, 250' and/or 250" may be enhanced.

We claim:

1. A heat assisted magnetic recording (HAMR) transducer coupled with a laser for providing energy and having an air-bearing surface (ABS) configured to reside in proximity to a media during use, the HAMR transducer comprising:
a waveguide optically coupled with the laser, the waveguide for directing energy from the laser toward the media;
an optical power monitor optically coupled with the waveguide, the optical power monitor for capturing a portion of the energy, for converting the portion of the energy to heat and for measuring a local temperature proximate to the optical power monitor; and
at least a one temperature sensor thermally decoupled with the heat generated by the optical power monitor, the at least one temperature sensor and the optical power monitor providing a differential temperature measurement.

2. The HAMR transducer of claim 1 wherein the at least the one temperature sensor is at least five microns and not more than ten microns from the optical power monitor.

3. The HAMR transducer of claim 1 wherein the optical power monitor and the at least the one temperature sensor are formed from a particular layer.

4. The HAMR transducer of claim 1 wherein the optical power monitor includes at least one of a metal, NiCr, a dielectric, carbon, silicon and NiFe.

5. The HAMR transducer of claim 1 wherein the waveguide includes a core and at least one cladding layer, the optical power monitor being at least one hundred fifty nanometers from the core and not more than four hundred nanometers from the core.

6. The HAMR transducer of claim 1 wherein the optical power monitor further includes
an absorber optically coupled with the waveguide, the absorber for capturing the portion of the energy and converting the portion of the energy to heat; and
at least one temperature sensor thermally coupled with the absorber and for measuring the local temperature proximate to the absorber.

7. The HAMR transducer of claim 6 wherein the at least one temperature sensor adjoins the absorber.

8. A heat assisted magnetic recording (HAMR) transducer coupled with a laser for providing energy and having an air-bearing surface (ABS) configured to reside in proximity to a media during use, the HAMR transducer comprising:
a waveguide optically coupled with the laser, the waveguide for directing energy from the laser toward the media;
an optical power monitor optically coupled with the waveguide, the optical power monitor for capturing a portion of the energy, for converting the portion of the energy to heat and for measuring a local temperature proximate to the optical power monitor; and
wherein the energy has a transmission direction along the waveguide and a mode width in a direction transverse to the transmission direction, the optical power monitor has a width in the direction transverse to the transmission direction, the width being substantially the same as the mode width.

9. The HAMR transducer of claim 8 wherein the width is not more than one micron.

10. The HAMR transducer of claim 1 wherein the portion of the energy is at least one percent and not more than seventy percent of the energy.

11. A heat assisted magnetic recording (HAMR) transducer coupled with a laser for providing energy and having an air-bearing surface (ABS) configured to reside in proximity to a media during use, the HAMR transducer comprising:
a waveguide optically coupled with the laser, the waveguide for directing energy from the laser toward the media;
an optical power monitor optically coupled with the waveguide, the optical power monitor for capturing a portion of the energy, for converting the portion of the energy to heat and for measuring a local temperature proximate to the optical power monitor; and
wherein the waveguide is an interferometric waveguide including an entrance, a split and a plurality of arms, the optical power monitor residing between the entrance and the split.

12. A heat assisted magnetic recording (HAMR) transducer coupled with a laser for providing energy and having an air-bearing surface (ABS) configured to reside in proximity to a media during use, the HAMR transducer comprising:
a waveguide optically coupled with the laser, the waveguide for directing energy from the laser toward the media;
an optical power monitor optically coupled with the waveguide, the optical power monitor for capturing a portion of the energy, for converting the portion of the energy to heat and for measuring a local temperature proximate to the optical power monitor; and
wherein the waveguide includes a tapping arm, the optical power monitor residing proximate to the tapping arm and capturing the portion of the energy from the tapping arm.

13. A heat assisted magnetic recording (HAMR) transducer coupled with a laser for providing energy and having an air-bearing surface (ABS) configured to reside in proximity to a media during use, the HAMR transducer comprising:
a waveguide optically coupled with the laser, the waveguide for directing energy from the laser toward the media;
an optical power monitor optically coupled with the waveguide and including an absorber, the optical power monitor for capturing a portion of the energy, for converting the portion of the energy to heat and for measuring a local temperature proximate to the optical power monitor; and
a near-field transducer (NFT) proximate to the ABS, the waveguide including an entrance, an ABS portion proximate to the NFT and an additional portion, the ABS portion coupling a writing portion of the energy to the NFT and residing between the entrance and the additional portion, the absorber residing proximate to the additional portion and capturing the portion of the energy from the additional portion of the waveguide.

14. The HAMR transducer of claim 1 wherein the optical power monitor is configured as a grating.

15. A heat assisted magnetic recording (HAMR) transducer coupled with a laser for providing energy and having an air-bearing surface (ABS) configured to reside in proximity to a media during use, the HAMR transducer comprising:

a waveguide optically coupled with the laser, the waveguide for directing energy from the laser toward the media;

an optical power monitor optically coupled with the waveguide, the optical power monitor for capturing a portion of the energy, for converting the portion of the energy to heat and for measuring a local temperature proximate to the optical power monitor;

wherein the optical power monitor is configured as a grating; and wherein the grating has a pitch of at least one hundred nanometers and not more than one micron.

16. A heat assisted magnetic recording (HAMR) transducer coupled with a laser for providing energy and having an air-bearing surface (ABS) configured to reside in proximity to a media during use, the HAMR transducer comprising:

a waveguide optically coupled with the laser, the waveguide for directing energy from the laser toward the media;

an optical power monitor optically coupled with the waveguide, the optical power monitor for capturing a portion of the energy, for converting the portion of the energy to heat and for measuring a local temperature proximate to the optical power monitor;

wherein the optical power monitor is configured as a grating; and wherein the grating is configured to reduce reflection and transmission of the energy.

17. A heat assisted magnetic recording (HAMR) transducer coupled with a laser for providing energy and having an air-bearing surface (ABS) configured to reside in proximity to a media during use, the HAMR transducer comprising:

a waveguide optically coupled with the laser, the waveguide for directing energy from the laser toward the media;

an optical power monitor optically coupled with the waveguide, the optical power monitor for capturing a portion of the energy, for converting the portion of the energy to heat and for measuring a local temperature proximate to the optical power monitor;

wherein the optical power monitor is configured as a grating; and wherein the grating is configured to tune the portion of the energy captured by the optical power monitor.

18. A heat assisted magnetic recording (HAMR) disk drive comprising: a media for storing data; a slider having an air-bearing surface (ABS) configured to reside in proximity to the media during use; a laser coupled with the slider for providing energy; a HAMR transducer coupled with the slider and including a waveguide, and an optical power monitor optically coupled with the waveguide, the waveguide being optically coupled with the laser and for directing energy from the laser toward the media, the optical power monitor for capturing a portion of the energy, for converting the portion of the energy to heat and for measuring a local temperature proximate to the optical power monitor; and wherein at least one of the HAMR transducer further includes at least a one temperature sensor thermally decoupled with the heat generated by the optical power monitor, the energy has a transmission direction along the waveguide and a mode width in a direction transverse to the transmission direction, the waveguide is an interferometric waveguide, the waveguide includes a tapping arm, the HAMR transducer further includes a near-field transducer (NFT) proximate to the ABS, and the optical power monitor is configured as a grating; wherein the at least one temperature sensor and the optical power monitor providing a differential temperature measurement; wherein the optical power monitor has a width in the direction transverse to the transmission direction, the width being substantially the same as the mode width; wherein the interferometric waveguide including an entrance, a split and a plurality of arms, the optical power monitor residing between the entrance and the split; wherein the optical power monitor resides proximate to the tapping arm and captures the portion of the energy from the tapping arm; wherein if the HAMR transducer includes the NFT then the waveguide includes an entrance, an ABS portion proximate to the NFT and an additional portion, the ABS portion coupling a writing portion of the energy to the NFT and residing between the entrance and the additional portion, the absorber residing proximate to the additional portion and capturing the portion of the energy from the additional portion of the waveguide; wherein at least one of the grating has a pitch of at least one hundred nanometers and not more than one micron, the grating is configured to reduce reflection and transmission of the energy, and the grating is configured to tune the portion of the energy captured by the optical power monitor.

19. A method for monitoring laser power in a heat assisted magnetic recording (HAMR) disk drive, the HAMR disk drive including a media, a laser for providing energy, a slider, a HAMR transducer coupled with the slider and having an air-bearing surface (ABS) configured to reside in proximity to the media during use, the HAMR transducer further including a waveguide optically coupled with the laser and for directing energy from the laser toward the media, the method comprising:

capturing a portion of the energy in the waveguide and converting the portion of the energy to heat in an optical power monitor optically coupled with the waveguide; and sensing a local temperature proximate to the optical power monitor using the optical power monitor, the local temperature providing a measurement of the heat from the optical power monitor;

wherein the step of sensing the local temperature further includes:

performing a differential temperature measurement using at least one temperature sensor and at least a second temperature sensor thermally decoupled with the heat generated by the optical power monitor.

20. The method of claim 19 further including adjusting power to the laser based on the local temperature sensed by the optical power monitor.

21. The method of claim 19 wherein the step of capturing and converting further includes:

capturing the portion of the energy using a grating.

22. The HAMR transducer of claim 1 further comprising: a heat spreader adjacent to the optical power monitor.

* * * * *